Aug. 18, 1953  C. R. GOLLNICK  2,649,216
MATERIAL COLLECTING VEHICLE
Filed April 7, 1949  7 Sheets-Sheet 1

INVENTOR.
Cyril R. Gollnick,
BY
Cromwell, Greist & Warden
ATTYS.

Aug. 18, 1953  C. R. GOLLNICK  2,649,216
MATERIAL COLLECTING VEHICLE
Filed April 7, 1949  7 Sheets-Sheet 2
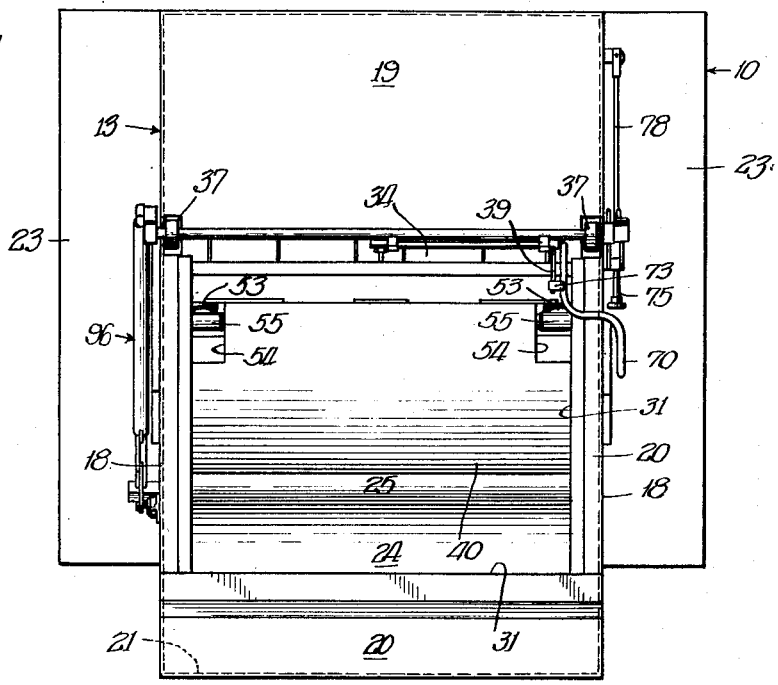
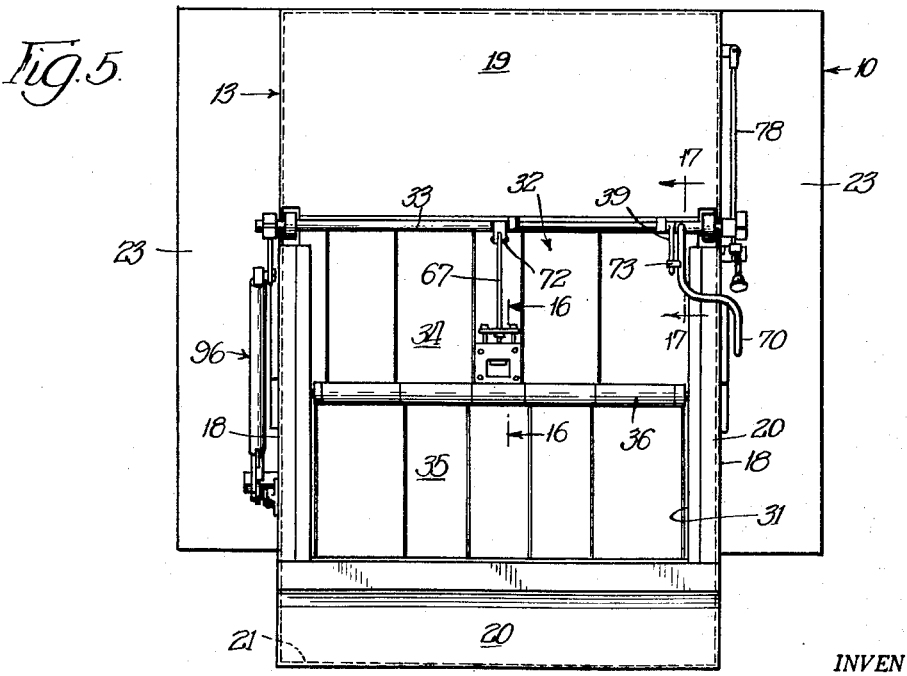
INVENTOR.
Cyril R. Gollnick,
BY
Cromwell, Greist & Warden
Attys Aug. 18, 1953  C. R. GOLLNICK  2,649,216
MATERIAL COLLECTING VEHICLE
Filed April 7, 1949  7 Sheets-Sheet 3
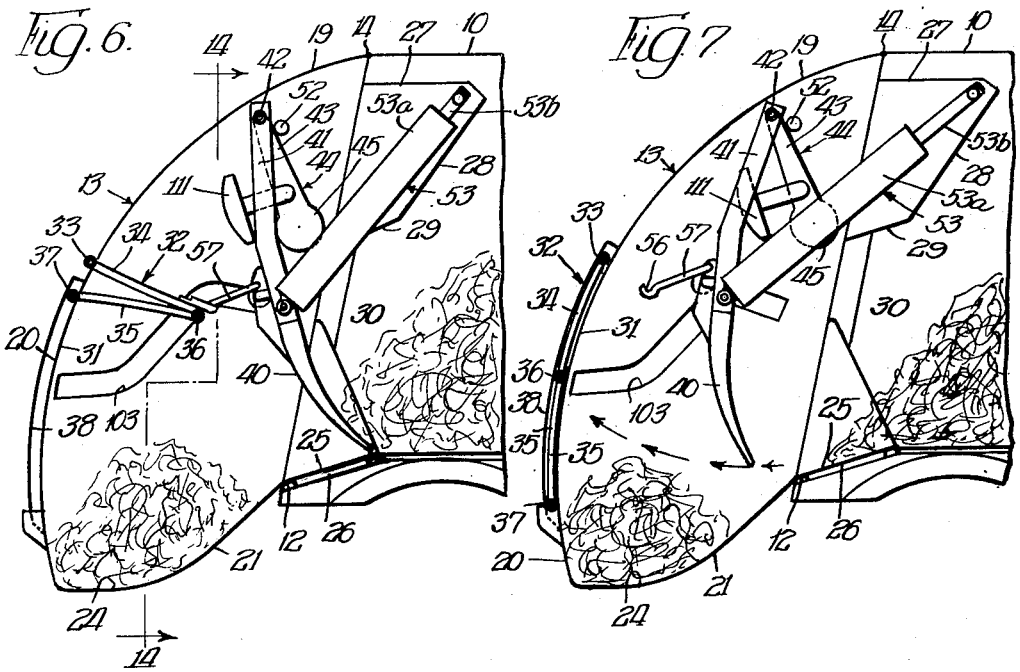
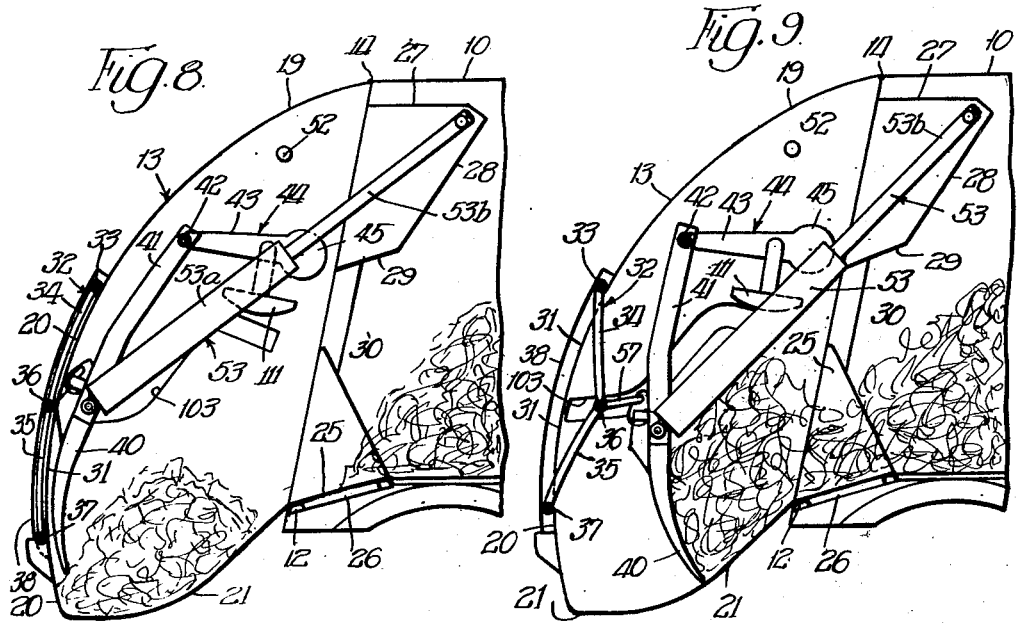
INVENTOR.
Cyril R. Gollnick,
BY
Cromwell, Greist & Warden
Attys Aug. 18, 1953  C. R. GOLLNICK  2,649,216
MATERIAL COLLECTING VEHICLE
Filed April 7, 1949  7 Sheets-Sheet 4
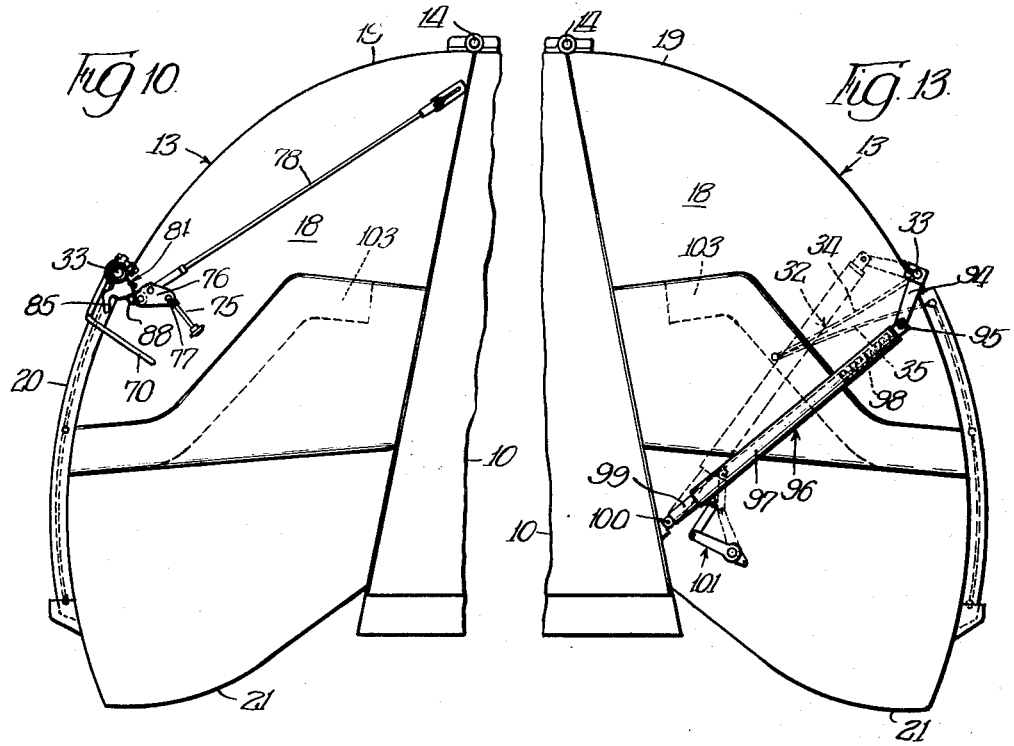
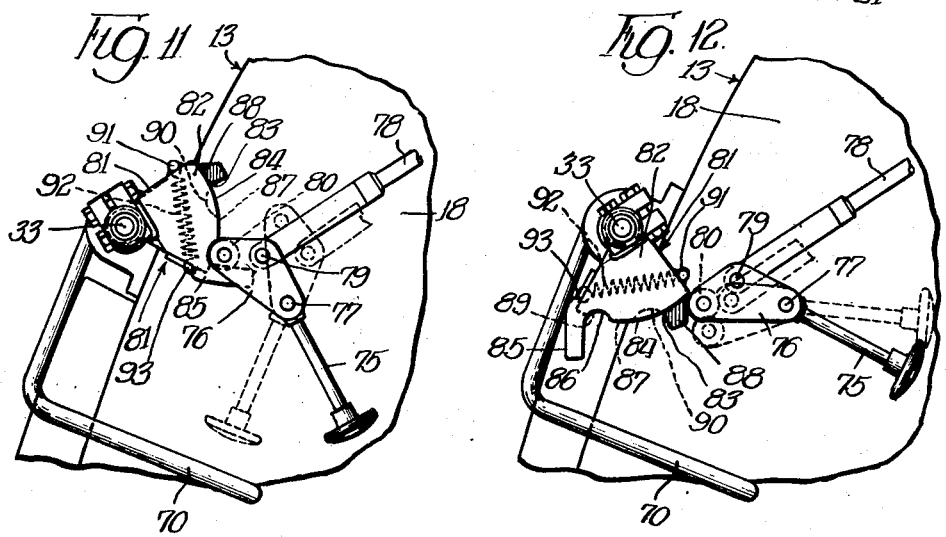
INVENTOR.
Cyril R. Gollnick,
BY
Cromwell, Greist & Warden
Attys Aug. 18, 1953     C. R. GOLLNICK     2,649,216
MATERIAL COLLECTING VEHICLE
Filed April 7, 1949                   7 Sheets-Sheet 5
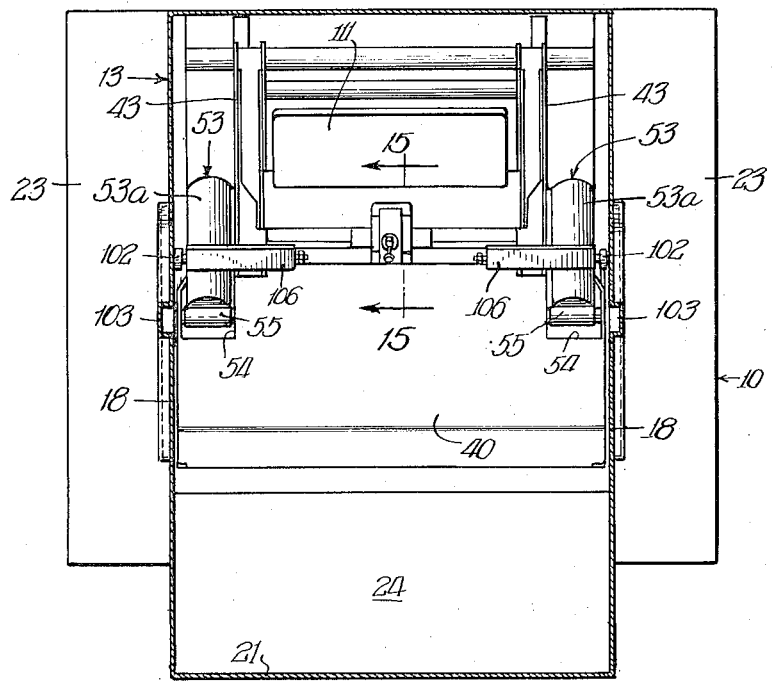
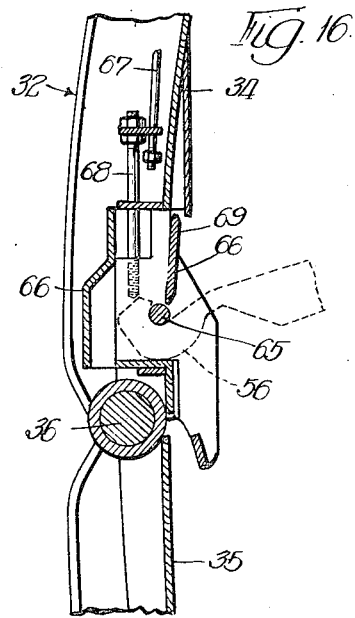
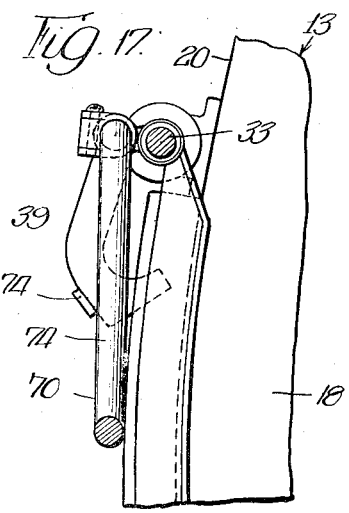
INVENTOR.
Cyril R. Gollnick,
BY
Cromwell, Greist & Warden
ATTYS Aug. 18, 1953   C. R. GOLLNICK   2,649,216
MATERIAL COLLECTING VEHICLE
Filed April 7, 1949   7 Sheets-Sheet 6

INVENTOR.
Cyril R. Gollnick,
BY
Cromwell, Greist & Warden
ATTYS

Aug. 18, 1953
C. R. GOLLNICK
2,649,216
MATERIAL COLLECTING VEHICLE
Filed April 7, 1949
7 Sheets-Sheet 7
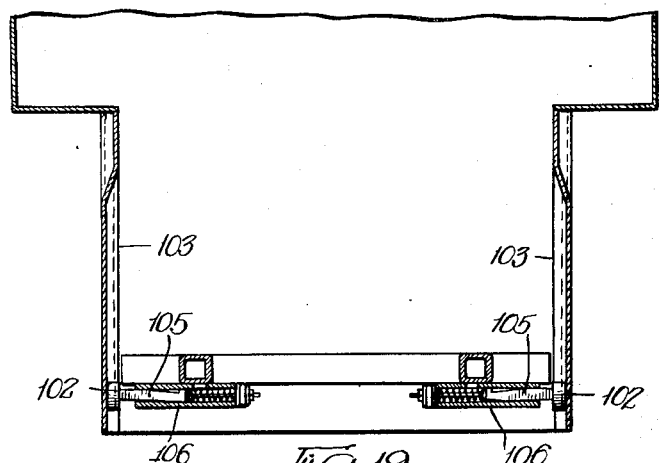
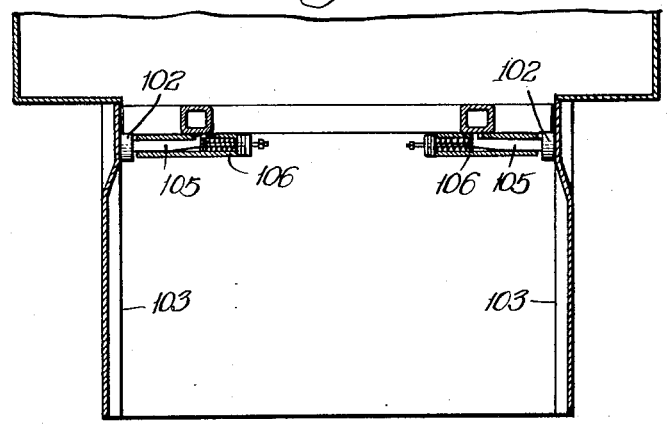
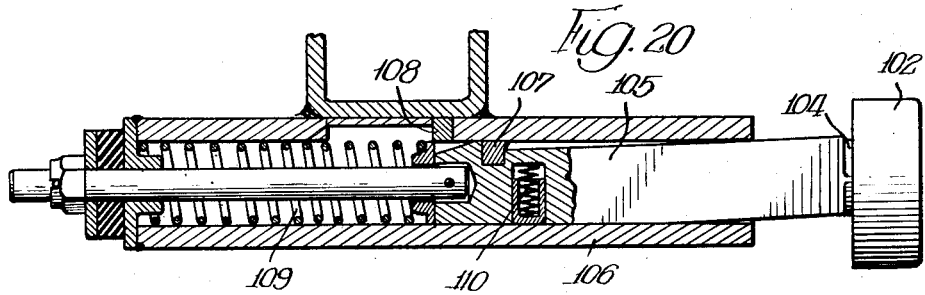
INVENTOR.
Cyril R. Gollnick,
BY
Cromwell, Greist & Warden
Attys Patented Aug. 18, 1953

2,649,216

UNITED STATES PATENT OFFICE 2,649,216

MATERIAL COLLECTING VEHICLE

Cyril R. Gollnick, Oshkosh, Wis., assignor to Leach Company, Oshkosh, Wis., a corporation of Wisconsin Application April 7, 1949, Serial No. 85,991

18 Claims. (Cl. 214—83.3)

The present invention has to do with large capacity material collecting vehicles of the type commonly used on city streets for making house-to-house collections of garbage, trash and other refuse.

In making such collections it is important that as large a load as possible be collected before having to empty the vehicle as the dump or other point of disposal is usually located at some remote place. It is therefore desirable that the material be collected with a minimum expenditure of time and effort, and also that it be compressed to a certain extent while being collected in order to increase the effective storage capacity of the vehicle.

The object of this invention is to provide a new and improved material collecting vehicle of the self-loading type which will load the material into the body simply, easily, quickly, and with a minimum expenditure of power, and which will at the same time compact the material to a certain extent.

While the foregoing statements are indicative in a general way of the nature of the invention other more specific objects and advantages will be apparent to those skilled in the art upon a full understanding of the construction, arrangement and operation of the new material collecting vehicle.

One embodiment of the invention is presented herein by way of exemplification but it will of course be appreciated that the invention is susceptible of incorporation in various other structurally modified forms coming equally within the scope of the appended claims.

In the accompanying drawings:

Fig. 4 is a rear end view of the vehicle, showing the retractable loading door open, the hopper exposed in readiness for loading, and the packer plate in its forwardly advanced load retaining position.

Fig. 5 is a similar view, showing the loading door closed;

Fig. 6 is a schematic sectional side view of the loading mechanism, with the loading door open and the packer plate in its normal load retaining position;

Fig. 7 is a similar but progressive view, showing the mechanism after the loading door has been closed and the then elevated packer plate has started swinging rearwardly above the load in the hopper;

Fig. 8 is a similar but further progressive view, showing the packer plate descending behind the load in the hopper;

Fig. 9 is a similar but still further progressive view, showing the packer plate moving bodily forward in the hopper and carrying the load before it, the plate riding up the inclined portion of the hopper toward the starting position of the plate shown in Fig. 6;

Fig. 10 is a side view of the right side of the tail gate, illustrating the lever and linkage used in actuating the valve of the hydraulic power system;

Fig. 11 is a more detailed view of the same parts, showing in full lines the position of the lever when the control valve is in its neutral position, and showing in dotted lines the position which the lever assumes when the valve has shifted into a position to cause the then lowered packer plate to move forwardly behind the load in the hopper (as in Figs. 8 and 9);

Fig. 12 is another view of the same parts, showing in full lines the position of the lever when the valve is shifted to cause the packer plate to start swinging rearwardly over the load in the hopper (as in Fig. 7), and showing in dotted lines the over-travel position of the lever in moving into said position from its neutral position;

Fig. 13 is a side view of the left side of the tail gate, illustrating the control or balancing spring mechanism for the retractable loading door, the mechanism being shown in full lines in the position which it assumes when the door is closed, as in Fig. 5, and in dotted lines in the position which it assumes when the door is open, as in Fig. 4.

Fig. 14 is a vertical transverse section through the tail gate, taken midway of the hopper, with the packer plate partially advanced, and with the side hold-down rollers for the plate in locked engagement with the channeled tracks in the side walls of the tail gate;

Fig. 16 is a fragmentary vertical transverse section through the center part of the loading door, in the closed position of the latter, taken on the line 16—16 of Fig. 5, showing the retractable latch which when manually actuated uncouples the door opening hook carried by the packer plate;

Fig. 17 is a fragmentary vertical transverse section through the upper part of the loading door, in its closed position, taken on the line 17—17 of Fig. 5, showing the safety hook which engages with the lower edge of the door when the door is open;

Fig. 18 is a generally horizontal transverse section through the tail gate and packer plate, taken at the level of the rear ends of the guide tracks in the side walls of the tail gate, showing the hold-down rollers projected laterally into the tracks to hold the lower edge of the plate down in the hopper during its forward movement;

Fig. 19 is a similar view, at a higher level, showing the rollers in their retracted positions after having been cammed inwardly out of the tracks by the inwardly inclined front ends of the tracks; and Fig. 20 is a detailed longitudinal section through one of the hold-down roller assemblies, showing the roller in the projected position which it assumes when released for movement into its track.

Figure 1:
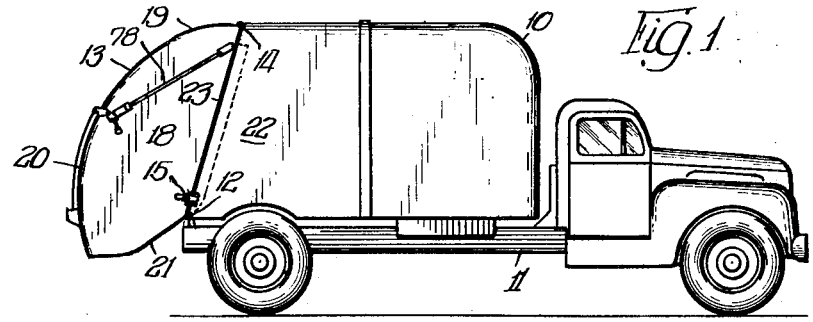
Fig. 1 is a side view of a material collecting vehicle constructed in accordance with the invention.
Figure 2:
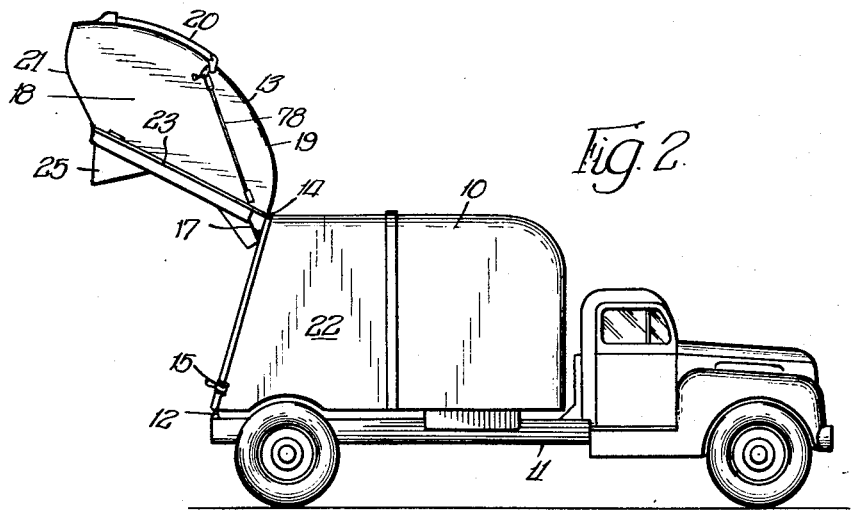
Fig. 2 is another side view of the vehicle, showing the tail gate raised in readiness to dump the load.
Figure 3:
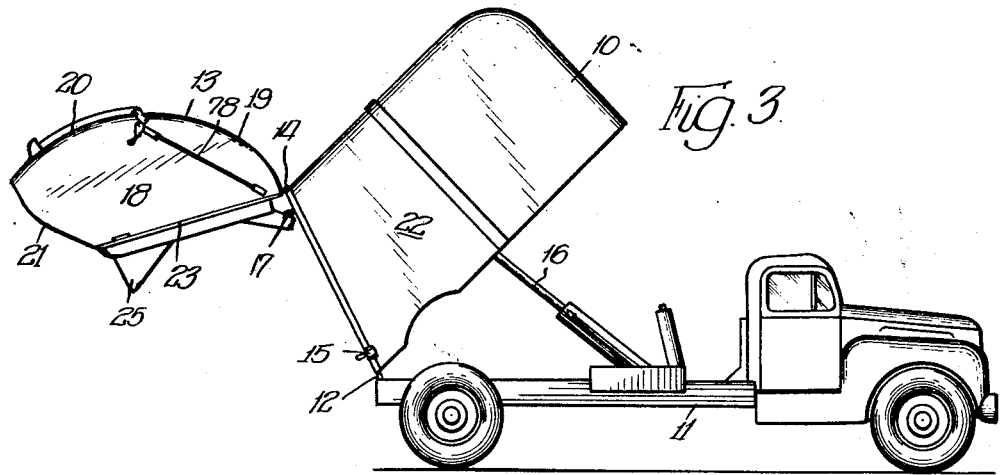
Fig. 3 is another side view of the vehicle, with the tail gate raised and with the body tilted rearwardly into dumping position.

As will be observed in the drawings, the vehicle includes a large capacity storage body 10 of generally rectangular form which is mounted on a truck chassis 11. The rear end of the body 10 is open and is hinged at 12 to the chassis 11 to permit dumping of the contents through such open end when the body is tilted up into position shown in Fig. 3. The open end of the body 10 is normally closed and sealed by a tail gate 13, in which tail gate the loading mechanism of the present invention is housed. The upper end of the tail gate 13 is pivotally connected at 14 to the body 10 to permit the tail gate to be swung up into the out-of-the-way position shown in Fig. 2 prior to the body being tilted up for dumping. When the tail gate 13 is in the normal body closing position shown in Fig. 1 it is securely held in such position by manually releasable side clamps 15 of any suitable form. The body 10 is tilted up by means of a hydraulically operated mechanism 16, while the tail gate 13 is swung up by means of a hydraulically operated mechanism 17, which mechanisms may be of any suitable character.

The tail gate 13 is a box-like structure which is characterized by parallel vertical side walls 18, a downwardly and rearwardly sloping top 19, a downwardly and forwardly curved rear wall 20, and a forwardly and upwardly sloping bottom 21. The side walls 18 of the tail gate are arranged closer together than the side walls 22 of the body 10 and the resulting offsets are spanned by outturned flanges 23 near the front edges of the side walls 18. The bottom 21 of the tail gate constitutes with the side walls 18 a hopper 24 into which the refuse or other material is dumped by hand from portable cans or other containers.

The hopper 24 terminates forwardly in an elevated angularly disposed sill 25, which sill continues forwardly for a short distance at a more gradual forward and upward inclination, projecting into the open rear end of the body 10 over a correspondingly shaped portion 26 of the bottom of the body. Immediately above the sill 25 the lower portion of the front end of the tail gate 13 is open. The upper portion however is closed by a transversely extending shield 27, which shield is secured at its ends to the side walls 18. The front face 28 of the shield 27 provides in effect a rear wall for the upper portion of the body 10 when the tail gate 13 is closed, while the lower face 29 of the shield forms the top of a forwardly and upwardly inclined passageway 30 over the sill 25.

The rear wall 20 of the tail gate 13 is provided with a material-receiving opening 31 of rectangular form which is set inwardly somewhat from the side walls 18 and extends upwardly from a convenient loading height near the bottom 21 of the tail gate to a point about half way up the rear wall. The material which is to be collected is dumped into the hopper 24 through the opening 31, the attendants resting the cans or other containers on the lower edge of such opening while emptying the same. The opening 31 is closed by a loading door 32, which door is provided across the top of the same with a rod 33 which is hinged to the top of the opening. The door 32 is composed of upper and lower foldable sections 34 and 35, which are hinged together at 36, and the free edge of the lower section 35 is provided with guide rollers 37 which project laterally into grooves 38 formed in the sides of the opening 31. When the door 32 is open the sections 34 and 35 assume the folded together position shown in Fig. 6, and when the door is closed the sections assume the straightened position shown in Fig. 7. The door 32 is secured against accidental release in its open position by a pivotally mounted safety latch 39 (see Figs. 4 and 17) which swings into a position beneath the free edge of the lower section 35 of the door as soon as the door has been folded into its open position.

Figure 15:
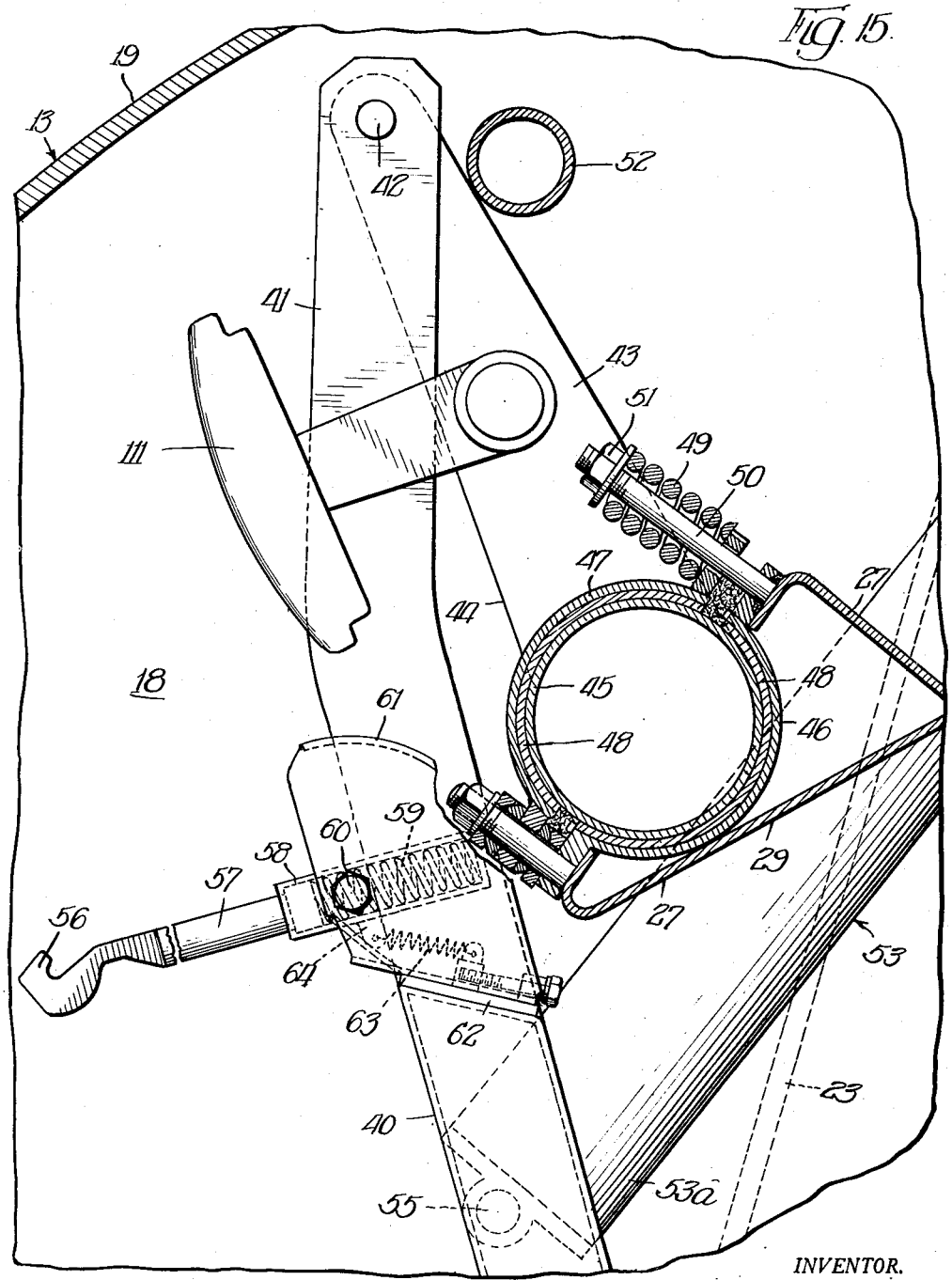
Fig. 15 is a fragmentary vertical longitudinal section, taken on the line 15—15 of Fig. 14, showing in detail the door opening hook carried by the packer plate and the friction brake for resisting pivotal movement of the hinge bracket.

The new loading mechanism includes a movable packer plate 40 which is positioned crosswise within the tail gate 13. The plate 40 is of generally rectangular, forwardly curved spade-like form and extends from one side wall 18 to the other. The plate 40 is provided adjacent its side edges with two upwardly projecting extensions 41, which extensions are pivotally suspended at their upper ends by pins 42 from the free ends of two torque arms 43 which project upwardly from a carrier bracket 44. The bracket 44 includes a transversely extending cylindrical tube 45 of substantial diameter to which the arms 43 are fixedly secured. The tube 45 is rotatably supported intermediate the arms 43 in arcuate seats 46 (see Fig. 15) located in the shield 27, and is held in such seats by complementary arcuate straps 47. The seats 46 and the straps 47 are lined with bands 48 of braking material and are clamped resiliently together on such bands by springs 49 mounted on studs 50 beneath adjusting nuts 51. The friction bands 48 permit the bracket 44 to be rocked through a limited angle, from the position shown in Fig. 6 to the position shown in Fig. 8, and back again, but only when very substantial torque is applied to the bracket through the arms 43. Several sets of seats 46, straps 47 and brake bands 48 are preferably employed to obtain the desired torque.

From the foregoing it will be understood that the packer plate 40 is suspended from the carrier bracket 44 in a generally vertical position, for both pivotal and translatory movement, and that the angular position assumed by the torque arms 43 of the bracket 44 at different times determines the elevation of the lower edge of the packer plate 40 with the respect to the hopper 24 at various stages in the operating cycle of the plate. In their most nearly vertical position the torque arms 43 of the bracket are held against further forward movement by a fixed stop in the form of a cross rod 52.

The packer plate 40 is moved forwardly and rearwardly by means of two laterally spaced simultaneously operating hydraulic cylinder mechanisms 53, which mechanisms are located in the tail gate 13 with their rear ends disposed in offset 54 formed in the sides of the plate. The mechanisms 53 include cylinders 53a and piston rods 53b, which rods are connected within the cylinders to pistons (not shown). The cylinders 53a are pivotally connected at their rear ends to the sides of the plate 40 by pins 55 which are located about half way up the sides of the plate, while the piston rods 53b are pivotally anchored at their front ends to the sides of the tail gate.

The operation of the hydraulic cylinder mechanisms 53, which act to force the packer plate 40 first rearwardly and then forwardly during each loading cycle, is controlled by suitable valves (not shown) which may be actuated manually but are preferably actuated in the automatic manner hereinafter described.

The packer plate 40 during each loading cycle operates as follows:

Starting with the plate 40 in its normal elevated load-retaining position in the passageway 30 and with its lower edge at substantially the front end of the sill 25, as shown in Fig. 6, actuation of the then contracted hydraulic cylinder mechanisms 53 causes the cylinders 53a connected with the sides of the plate 40 to move rearwardly. This results in the plate 40 being swung rearwardly about the then stationary elevated pivot point 42, with the lower edge of the plate passing rearwardly over the load in the hopper 24, as shown by the arrows in Fig. 7.

As soon as the lower edge of the plate 40 comes into engagement with the rear wall 13 of the tail gate the continued rearward movement of the cylinders 53a causes the plate 40 to move bodily downward in guided engagement with the rear wall, as shown in Fig. 8, such downward movement continuing until the lower edge of the plate has reached substantially the bottom of the hopper 24, in a position behind the load of refuse or other material in the hopper.

When the plate 40 reaches its lowermost position in the hopper 24 the flow of the fluid operating the hydraulic cylinder mechanisms 53 is reversed, whereupon the plate 40 is caused by the pull exerted thereon by such mechanisms to move bodily forward, as shown in Fig. 9, forcing the load forwardly in the hopper 24 and into and through the passageway 30. As the plate 40 moves forward it also travels upwardly in conformity with the forward and upward inclination of the front part of the bottom of the hopper, until the torque arms 43 of the bracket 44 in swinging upwardly with the plate 40 come into abutment with the cross rod 52, which abutment occurs when the lower edge of the plate reaches the front upper end of the bottom of the hopper at the beginning of the more gradually inclined sill 25. When the arms 43 of the bracket abut with the rod 52 the plate 40 is prevented from moving bodily upward or forward any further and is thereafter caused to swing forwardly in an arc through the passageway 30 about the then stationary pivot point 42, from the rear edge of the sill 25 to the front edge of the latter, the plate 40 coming to rest again in its normal load-retaining position, which position is shown in Fig. 6. The inclined sill 25, which may be either straight or slightly curved, is so disposed that the lower edge of the plate in swinging forwardly about the then stationary pivot point 42 will approximately follow the surface of the sill, forcing the load across the sill under a substantial multiplication of torque and into the body, into compacted relation with whatever material is already present in the body.

The loading door 32 is adapted to be closed at the time that the packer plate 40 starts its above described loading cycle, and is adapted to be opened again during the latter part of such cycle, in the manner and by the means hereinafter described.

The packer plate 40 carries a rearwardly projecting upward facing hook 56 (see Fig. 16), which hook acts during the forward movement of the plate to automatically open the loading door 32, but only after the plate has moved downwardly behind the load in the hopper 24 and has started to push the load forwardly and upwardly along the bottom 21 of the hopper.

The shank 57 of the hook 56 is slidably telescoped within a tube 58 in endwise engagement with a compressed coil spring 59 in the tube, and the tube 58 is in turn pivotally mounted on trunnions 60 in a small casing 61. The casing 61 is secured to the upper edge 62 of the load engaging portion of the plate 40, midway between the upwardly projecting extensions 41 on the plate. An adjustably tensioned coil spring 63 within the casing 61 acts through the tube 58 to yieldingly bias the direction of projection of the hook 56. The hook 56 is adapted to engage with a shiftably mounted keeper 65 (see Fig. 16) which is located on the loading door 32 just above the hinge connection 36 between the upper and lower sections 34 and 35 of the door.

The keeper 65 is mounted on the door 32 in a housing 66, which housing is positioned in a recess in the lower portion of the upper section 34 of the door. The housing 66, with the keeper 65, is shiftable in suitable guides toward and away from the hinge connection 36. A control rod 67, which is coupled to the housing 66 by an adjustable pin 68, is provided for retracting the keeper 65 to disengage it from the hook 66. When the keeper 65 is retracted by an upward movement of the rod 67 the keeper will be stripped from the hook 56 by abutment of the upper edge and the hook with a stationary block 69 in the recess in the door. This releasing action takes place only when the door 32 is in its inwardly folded open position (see Fig. 6), and then only when the loading cycle is initiated by the operator pulling on a hand lever 70 (see Figs. 4 and 17) on the outside of the tail gate 13.

The hand lever 70 is connected at its upper end to a horizontally extending rod 71 which is journalled in suitable bearings in rearwardly offset relation to the hinge rod 33 of the door 32. The rod 71, which also provides a journal for the freely suspended safety latch 39, terminates adjacent the center of the top of the door 32 in a short rearwardly extending lever arm 72 to which the upper end of the keeper retracting rod 67 is connected.

When the hand lever 70 is pulled rearwardly the resulting rotation of the rod 71 will pull upwardly upon the keeper retracting rod 67, causing the keeper 65 to be released from the hook 56. The safety latch 39 is provided with a small laterally extending ear 73 which is disposed immediately to the rear of a portion 74 of the hand lever 70, with the result that when the hand lever 70 is pulled it will at the same time act to move the safety latch 39 into an out-of-the-way position, thereby permitting the released door 32 to drop by gravity into its fully closed position.

When the packer plate 40 during its rearward movement approaches the rear wall 20 of the tail gate the hook 56 will move into engagement with the inside of the upper section 34 of the then closed loading door 32 and will travel down the same with the plate 40 until it reaches the location of the again operatively positioned keeper 65, at which time the hook 56 will re-engage with the keeper 65. When the plate 40 thereafter starts moving forwardly it will start folding up the door 32, moving the door as shown in Fig. 9 from the closed position shown in Fig. 8 to the fully open position shown in Fig. 6, in which latter position the door will be held until the next loading cycle is started.

While the valve mechanism (not shown) of the hydraulic cylinder mechanisms 53 which operate the packer plate 40 might of course be actuated and controlled throughout the loading cycle by the manipulation of a separate hand lever after the loading door 32 has been released and closed, means may be advantageously provided for doing this automatically.

To this end a hand lever 75 (see Figs. 11 and 12) for operating the valve mechanisms of the hydraulic cylinder mechanisms 53 is located at one side of the tail gate 13 adjacent the hand lever 70. The hand lever 75—which is not intended to be used except in an emergency for the purpose of stopping the operation of the mechanisms 53 before the packer plate 40 has completed its cycle—is fixedly secured to one corner of a small generally triangular plate 76, which plate is pivotally connected at 77 to the tail gate. A rod 78, which leads to the valve mechanism, is pivotally attached at 79 to another corner of the plate 76. The plate 76 is provided at its remaining corner with an anti-friction roller 80, which roller is adapted to coact with a combined blocking and kick-over device 81 on the adjacent end of the hinge rod 33, which rod is fixedly secured to the upper edge of the upper section 34 of the loading door 32 and turns with that section.

The device 81 consists of two overlapping but relatively rotatable sector-shaped plates 82 and 83. The outer plate 82 is fixedly secured to the rod 33 for movement with the latter and is provided with an arcuate edge 84 which terminates at one end in a projecting finger 85. At the base of the finger 85 the arcuate edge 84 of the plate 82 is provided with a semicircular recess 86 for the reception of the roller 80 on the plate 76 when the valve mechanism is in its off or closed position (see Fig. 11).

The inner plate 83 of the device 81 is freely journalled on the rod 33 directly behind the outer plate 82, in close proximity to the latter. The plate 83 is provided, like the plate 82, with an arcuate edge 87, which edge terminates at the end opposite the finger 85 in a projecting finger 88. The arcuate edge 87 of the plate 83 is provided with two semicircular recesses, one, 89, which registers with the recess 86 when the plates are fully overlapped, and another, 90, which is located at the base of the finger 88. A pin 91 projects from one of the end edges of the plate 83 into abutment with the corresponding end edge of the plate 82, and a tensioned coil spring 92 connects the pin 91 with another pin 93 on the opposite end edge of the plate 82. The spring 92 tends to cause the plate 83 to turn with the plate 82, yielding resisting relative rotation therebetween.

The purpose of the device 81 is twofold—first, to lock out the hand lever 75 to prevent the latter from being inadvertently moved to start the loading cycle, and second, to forcibly kick over the plate 76 and hand lever 75 to automatically set the valve mechanism in operation as soon as the main control lever 70 has been pulled to drop the loading door.

The device 81—which serves as a safety means—functions as follows:

When the loading door 32 is in its open position the finger 85 on the then immovable outer plate 82 will hold the roller 80 against movement and prevent the emergency hand lever 75 from being moved out of its neutral position (which position is shown in full lines in Fig. 11) into its valve opening position (which position is shown in full lines in Fig. 12). When the loading door 32 drops into its closed position however, the finger 85 on the outer plate 82 will move downwardly out of the way of the roller 80, from the position shown in Fig. 11 to the position shown in Fig. 12, the roller will be carried downwardly a short distance clear of the notch 86, the finger 88 on the inner plate 83 will move downwardly against the roller 80 under the action of the spring 92, and the rapidly increasing pressure exerted by the finger 88 on the roller through the force built up in the spring will throw the roller forcibly and quickly with a snap action momentarily into the over-thrown position shown in dotted lines in Fig. 12, far enough to clear the end of the finger 88, after which the roller will immediately spring back into the position shown in full lines in Fig. 12. The valve operating rod 78 is provided intermediate its ends with a resiliently expansible connection (not shown) for accommodating the above described overthrow.

In this new position of the roller 80 the rod 78 is positioned to open the valve mechanism to cause the hydraulic cylinder mechanisms 53 to start moving the packer plate 40 rearwardly, as shown in Fig. 7.

The valve mechanism connected with the control rod 78 for operating the hydraulic cylinder mechanisms in first one direction and then the other, is preferably of the automatically reversing type, commonly employed with hydraulic cylinder mechanisms. Briefly described, it includes means of any suitable character whereby when the piston in the cylinder encounters excessive resistance in its movement in one direction, as when the lower edge of the packer plate 40 reaches the bottom of the hopper 24, the increased fluid pressure thereby built up against the immobilized piston in the cylinder acts extraneously upon the valve mechanism to reverse the latter, thus causing the piston to start moving in the opposite direction, at the end of which reverse movement the valve mechnism is shifted again, this time into its neutral position. Automatically reversing valve mechanisms of this general type are well known in the art. Such a mechanism is disclosed, for example, in Patent No. 2,260,947.

When the valve mechanism is automatically reversed such reversing action will shift the rod 78, and with it the triangular plate 76 and its attachments, from the position shown in full lines in Fig. 12 to the position shown in dotted lines in Fig. 11, thus removing the roller 80 from the path of return movement of the blocking and kick-over device 81 and allowing the latter to return to the position shown in Fig. 11 as the door 32 is folded inwardly into open position again by the then forwardly moving packer plate 40.

When the valve mechanism is thereafter automatically shifted into its neutral position at the end of the loading cycle such shifting action will return the rod 78, with its associated parts, into the position shown in Fig. 11, with the roller 80 again effectively blocked by the finger 85, in readiness for the next loading cycle.

When the door 32 is moved into either its open or its closed position, it is moved quickly and forcibly into such position by a small lever arm 94 on the far end of the door-hinging rod 33, which lever arm is pivoted at 95 to one end of a spring biasing device 96 (see Fig. 13). The device 96 consists of a tube 97 in which a coil spring 98 is compressed and in which a rod 99 is slidably telescoped in endwise abutment with the spring. The exposed end of the rod 99 is pivotally connected at 100 to the adjacent side of the tail gate 13. A shock absorbing device 101 of any suitable construction is connected with the tube 97, whereby to cushion the movement of the latter. When the door 32 is closed the spring biasing device 96 will assume the position shown in full lines in Fig. 13, and when the door is open the device will be sprung through a dead center position into the position shown in dotted lines in Fig. 13.

When the packer plate 40—after having swung rearwardly as shown in Fig. 7, and after having moved downwardly as shown in Fig. 8—reaches its lowermost position behind the load of material in the hopper, guide rollers 102 on the sides of the plate 40 will spring outwardly into track grooves 103 on the side walls 18 of the tail gate 13. The grooves 103 parallel generally the bottom 21 of the hopper 24, in vertically spaced relation to the latter, following the forward and upward inclination of the bottom 21 to a point corresponding approximately to the position of the plate 40 in the hopper at the time that the torque arms 43 of the carrier bracket 44 come into abutment with the cross rod 52, at which point the grooves merge gradually into the plane of the side walls 18 of the tail gate.

As the plate 40 moves forwardly in the hopper 24 the rollers 102 will travel forwardly in the grooves 103 until the plate reaches a position wherein the lower edge of the same is approaching the end of its forward travel, at which time the convergence of the ends of the grooves with the side walls 18 will cam the rollers inwardly.

The rollers 102 are journalled on the ends of short horizontally disposed shafts 104, which shafts have squared portions 105 which are slidably telescoped within correspondingly shaped casings 106 attached to the plate 40. The squared portions 105 of the shafts are provided with hooks 107 which are adapted to engage with shoulders 108 within the casings 106 when the shafts are pushed inwardly by the rollers 102. The shafts 104 are urged outwardly by compressed coil springs 109, and are capable of being tilted slightly in the casings against the yielding resistance of small side springs 110, whereby to enable the hooks 107 to be released from the shoulders 108. When the shafts 104 are pushed inwardly the side springs 110 will cause the hooks 107 to retain the shafts, and consequently the rollers, in retracted positions. When the retracted rollers 102 move into abutment with the rear wall 20 of the tail gate 13 during the first part of the loading cycle, such engagement will cause the shafts 104 to tilt within the casings 106 far enough to release the hooks 107 from the shoulders 108, allowing the rollers 102 to thereafter move outwardly into the grooves 103 in guided engagement with the latter.

Employment of the rollers 102 and grooves 103, while not necessary, is desirable to insure the lower edge of the packer plate 40 being maintained during its forward travel in reasonably close association with the bottom 21 of the hopper, notwithstanding the presence in the hopper of material which might otherwise tend to force the plate 40 upwardly away from the bottom 21 by a force sufficient to overcome the torsional resistance offered by the carrier bracket 44.

A tamper plate 111 (see Fig. 15) is preferably provided for pressing down any large upwardly projecting articles in the hopper which might otherwise present difficulties in being moved forwardly through the passageway 30. The tamper plate 111, which acts in coordination with the action of the packer plate 40, is rigidly mounted on the carrier bracket 44 in a position generally parallel to but spaced from the torque arms 43. As soon as the packer plate 40 has swung rearwardly over the load in the hopper 24 and commences to move bodily downward behind the load the tamper plate 111 will at the same time move downwardly over the load, crushing any upwardly projecting articles to a sufficient degree to insure their ready clearance through the passageway 30 upon the packer plate 40 thereafter moving forwardly.

I claim:

1. In a material collecting vehicle, a storage body, a loading hopper at the rear end of the body having a forwardly and upwardly inclined bottom in communication with the body, a carrier bracket pivotally mounted above the hopper, a packer plate pivotally suspended from the free end of the bracket, power means connected with the plate below its point of suspension for moving the plate forwardly and rearwardly, said power means also serving to lower the plate and the free end of the bracket to bring the plate into proximity to the bottom of the hopper at the beginning of the forward movement of the plate, whereby to cause the plate upon being moved forwardly in said lowered position to move material in the bottom of the hopper into the body, means for raising the plate and the free end of the bracket in general conformity with the inclination of the bottom of the hopper during the latter part of the forward movement of the plate, and means acting on the bracket to maintain the plate and the free end of the bracket in their raised positions during the rearward movement of the plate, whereby to cause the plate in moving rearwardly to pass over any material in the hopper.

2. In a material collecting vehicle, the combination with a storage body and a receiving hopper behind the body having a forwardly and upwardly inclined bottom, of a vertically movable support, a loading member pivotally connected at its upper end to said support for moving material from the hopper into the body, means for swinging the member rearwardly in vertically spaced relation to the bottom of the hopper about a then elevated stationary pivot point on said support over the material in the hopper, means for shifting the member bodily downward toward the bottom of the hopper from its rearwardly swung position to a position behind the material in the hopper, and means for moving the member bodily forward and upward through the hopper along the bottom thereof, whereby to move the material in the hopper from the latter into the body.

3. In a material collecting vehicle of the type characterized by a storage body which is open at its rear end, a tail gate which is pivotally connected at its upper end to the body for normally closing the rear end of the latter, and a receiving hopper in the bottom of the tail gate; the provision of an elevated passageway in the tail gate between the hopper and the body, a receiving opening in the rear wall of the tail gate above the hopper, a carrier bracket which is pivotally mounted at its lower end in the upper portion of the tail gate above the passageway, brake means for yieldingly resisting pivotal movement of the bracket, a stop for limiting the extent to which the free end of the bracket can swing forwardly, a packer plate which is pivotally suspended at its upper end from the free end of the bracket for rearward movement in the tail gate above the hopper and forward movement through the hopper into the passageway, power means connected with the plate between the pivotal connection between the latter and the bracket for moving the plate to transfer the contents of the hopper from the latter through the passageway into the body, said power means acting rearwardly on the plate when the free end of the bracket is in a raised position against the stop to first swing the then elevated plate rearwardly above the hopper to the rear wall of the tail gate and then shift the plate bodily downward along such wall behind the load to the bottom of the hopper as the continued rearward force exerted on the plate overcomes the resistance offered by said brake means and swings the free end of the bracket downwardly and rearwardly, said power means thereafter acting forwardly on the plate to first move the latter bodily forward through the hopper along the bottom of the latter with the free end of the bracket rising against the resistance of said brake means and then upon the bracket abutting the stop to swing the plate further forward into the passageway, and control means operable to cause said power means first to act rearwardly on the plate and then to automatically reverse and act forwardly on the same.

4. In a material collecting vehicle, the combination with a storage body and a receiving hopper behind the body having a forwardly and upwardly inclined bottom, of a vertically movable support, a loading member pivotally connected at its upper end to said support for moving material from the hopper into the body, means for swinging the member rearwardly in vertically spaced relation to the bottom of the hopper about a then elevated stationary pivot point on said support over the material in the hopper, means for shifting the member bodily downward toward the bottom of the hopper from its rearwardly swung position to a position behind the material in the hopper, means for moving the member bodily forward and upward through the hopper along the bottom thereof, whereby to move the material in the hopper from the latter into the body, and means for thereafter swinging the member forwardly about the above mentioned pivot point, whereby to compress such material against material already in the body.

5. A material collecting vehicle of the construction defined in claim 3, provided with guide means between the packer plate and the side walls of the tail gate operable to maintain the lower edge of the plate in scavenging relation to the bottom of the hopper during the forward movement of the plate.

6. A material collecting vehicle of the construction defined in claim 3, provided with a door for the receiving opening in the rear wall of the tail gate, a hook on the packer plate engageable with the door to move the latter into an open position when the plate is moved forwardly through the hopper into the passageway, and manually operable means for releasing said hook to close the door.

7. A material collecting vehicle of the construction defined in claim 3, provided with a door for the receiving opening in the rear wall of the tail gate, a hook on the packer plate engageable with the door to move the latter into an open position when the plate is moved forwardly through the hopper into the passageway, manually operable means for releasing said hook to close the door, and means actuated by the operation of said last mentioned means for automatically placing said control means in operation.

8. A material collecting vehicle of the construction defined in claim 3, provided with a tamper plate, which plate is connected to and moves with said carrier bracket and descends over the load as the packer plate descends behind the load, whereby to reduce the height of the load before the latter reaches the passageway opening into the body.

9. In a material collecting vehicle of the type having a storage body and a hopper behind the body in communication with the latter, a loading member, means for moving the member first rearwardly above the hopper and then forwardly through the hopper during each loading cycle to transfer material in the hopper into the body, means for maintaining the loading member in a substantially vertical position throughout its movement, a door for the hopper, manually operable means for closing the door at the beginning of each loading cycle, and means for automatically opening the door again prior to the end of each loading cycle.

10. In a material collecting vehicle of the type having a storage body and a hopper behind the body in communication with the latter, a loading member, means for moving the member first rearwardly above the hopper and then forwardly through the hopper during each loading cycle to transfer material in the hopper into the body, a door for the hopper, manually operable means for closing the door at the beginning of each loading cycle, and means for automatically opening the door again prior to the end of each loading cycle; said last named means comprising a connection between the loading member and the door.

11. In a material collecting vehicle of the type having a storage body, a hopper behind the body, and a passageway between the hopper and the body, a carrier bracket which is pivotally mounted at its lower end, brake means for yieldingly resisting pivotal movement of the bracket, a stop for limiting the extent to which the free end of the bracket can swing forwardly, a loading member which is pivotally suspended at its upper end from the free end of the bracket for rearward movement above the hopper and forward movement through the hopper into the passageway, power means for moving the loading member rearwardly and forwardly during each loading cycle, and manually operable control means for said power means.

12. In a material collecting vehicle, a storage body, a loading hopper having an upwardly inclined bottom in communication with the body, a carrier bracket pivotally mounted above the hopper, a packer plate pivotally suspended from the free end of the bracket, power means connected with the plate below its point of suspension for moving the plate forwardly and rearwardly, means for directing the plate from a bodily elevated position above the rear end of the bottom of the hopper into a bodily lowered position at the rear end of the bottom of the hopper, whereby to cause the plate when moved forwardly from such lowered position to push material in the bottom of the hopper into the body, means for raising the plate in general conformity with the inclination of the bottom of the hopper during the forward movement of the plate, and means for maintaining the bracket raised during the rearward movement of the plate, whereby to cause the plate in moving rearwardly to pass over any material in the hopper.

13. In a material collecting vehicle of the type characterized by a large capacity storage body which is open at its rear end, and an upwardly and rearwardly swingable tail gate for the same which is hinged to the top of the open rear end of the body and contains in its rear wall a receiving opening and a hopper in front of and below said opening having a forwardly and upwardly inclined bottom in communication with the body; the provision of new and improved means for moving any material deposited in the hopper from the latter into the body, comprising a generally upright bodily movable member which operates in the hopper and is provided adjacent its lower end with a material-engaging portion, and means for causing the member to travel in a circuitous path in a vertical plane, first backwardly with the lower material-engaging portion of the member maintained during such movement in vertically spaced relation to the bottom of the hopper whereby to pass over the material therein, then downwardly at the rear end of the hopper behind the material to a point where the lower edge of the material-engaging portion of the member substantially engages with the bottom of the hopper, and then forwardly and upwardly in conformity with the inclination of the bottom of the hopper whereby to move the material in the hopper into the body, said last mentioned means including push-and-pull power means pivotally connected with the member intermediate its upper and lower ends and backwardly and forwardly oscillating link means pivotally connected with the member adjacent its upper end.

14. In a material collecting vehicle of the type characterized by a large capacity storage body which is open at its rear end, and an upwardly and rearwardly swingable tail gate for the same which is hinged to the top of the open rear end of the body and contains in its rear wall a receiving opening and a hopper in front of and below said opening having a forwardly and upwardly inclined bottom in communication with the body; the provision of new and improved means for moving any material deposited in the hopper from the latter into the body, comprising a generally upright bodily movable member which operates in the hopper and is provided adjacent its lower end with a material-engaging portion, means for causing the member to travel in a circuitous path in a vertical plane, first backwardly with the lower material-engaging portion of the member maintained during such movement in vertically spaced relation to the bottom of the hopper whereby to pass over the material therein, then downwardly at the rear end of the hopper behind the material to a point where the lower edge of the material-engaging portion of the member substantially engages with the bottom of the hopper, and then forwardly and upwardly in conformity with the inclination of the bottom of the hopper whereby to move the material in the hopper into the body, said last mentioned means including push-and-pull power means pivotally connected with the member intermediate its upper and lower ends and backwardly and forwardly oscillating link means pivotally connected with the member adjacent its upper end, and control mechanism for manually starting said power means when the member is in its forward position and for automatically stopping said power means when the member has completed its circuitous travel and has returned again to its forward position.

15. In a material collecting vehicle of the type characterized by a large capacity storage body which is open at its rear end, and an upwardly and rearwardly swingable tail gate for the same which is hinged to the top of the open rear end of the body and contains in its rear wall a receiving opening and a hopper in front of and below said opening having a forwardly and upwardly inclined bottom in communication with the body; the provision of new and improved means for moving any material deposited in the hopper from the latter into the body, comprising a generally upright bodily movable member which operates in the hopper and is provided adjacent its lower end with a material-engaging portion, means for causing the member to travel in a circuitous path in a vertical plane, first backwardly with the lower material-engaging portion of the member maintained during such movement in vertically spaced relation to the bottom of the hopper whereby to pass over the material therein, then downwardly at the rear end of the hopper behind the material to a point where the lower edge of the material-engaging portion of the member substantially engages with the bottom of the hopper, and then forwardly and upwardly in conformity with the inclination of the bottom of the hopper whereby to move the material in the hopper into the body, said last mentioned means including push-and-pull power means pivotally connected with the member intermediate its upper and lower ends and backwardly and forwardly oscillating link means pivotally connected with the member adjacent its upper end, control mechanism for manually starting said power means when the member is in its forward position and for automatically stopping said power means when the member has completed its circuitous travel and has returned again to its forward position, and additional control mechanism for manually stopping said power means at any point in the travel of the member.

16. In a material collecting vehicle of the type characterized by a storage body which is open at its rear end, a tail gate which is pivotally connected at its upper end to the body for normally closing the rear end of the latter, and a receiving hopper in the bottom of the tail gate; the provision of an elevated passageway in the tail gate between the hopper and the body, a receiving opening in the rear wall of the tail gate above the hopper, a carrier bracket which is pivotally mounted at its lower end in the upper portion of the tail gate above the passageway, a stop for limiting the extent to which the free end of the bracket can swing forwardly, a packer plate which is pivotally connected at its upper end to the free end of the bracket for rearward movement in the tail gate above the hopper and forward movement through the hopper into the passageway, power means connected with the plate below the pivotal connection between the latter and the bracket for moving the plate to transfer the contents of the hopper from the latter through the passageway into the body, said power means acting rearwardly on the plate when the free end of the bracket is in a raised position against the stop to first swing the then elevated plate rearwardly above the hopper to the rear wall of the tail gate and then shift the plate bodily downward along such wall behind the load to the bottom of the hopper, said power means thereafter acting forwardly on the plate to first move the latter bodily forward through the hopper along the bottom of the latter with the free end of the bracket rising and then upon the bracket abutting the stop to swing the plate further forward into the passageway, and control means operable to cause said power means first to act rearwardly on the plate and then to automatically reverse and act forwardly on the same.

17. In a material collecting vehicle, a storage body, a loading hopper at the rear end of the body having a forwardly and upwardly inclined bottom in communication with the body, a carrier bracket pivotally mounted above the hopper for forward and backward oscillatory movement of its free end, a packer plate pivotally connected at its upper end with the free end of the bracket, power means connected with the plate below its point of pivotal connection with the bracket for moving the plate forwardly and rearwardly, means for lowering the plate and the free end of the bracket to bring the plate into proximity to the bottom of the hopper at the beginning of the forward movement of the plate, whereby to cause the plate upon being moved forwardly in said lowered position to move material in the bottom of the hopper into the body, means for raising the plate and the free end of the bracket in general conformity with the inclination of the bottom of the hopper during the latter part of the forward movement of the plate, and means for maintaining the plate and the free end of the bracket in their raised positions during the rearward movement of the plate, whereby to cause the plate in moving rearwardly to pass over any material in the hopper.

18. In a material collecting vehicle of the type characterized by a large capacity storage body which is open at its rear end, an upwardly and rearwardly swingable tail gate for the same which is hinged to the top of the open rear end of the body and contains in its rear wall a receiving opening and a hopper in front of and below said opening having a forwardly and upwardly inclined bottom in communication with the body and a door for said receiving opening; the provision of new and improved means for moving any material deposited in the hopper from the latter into the body, comprising a movable member which operates in the hopper and is provided adjacent its lower end with a material-engaging portion, means for causing the member to travel in a circuitous generally triangular path in a vertical plane, first backwardly with the lower material-engaging portion of the member maintained during such movement in vertically spaced relation to the bottom of the hopper whereby to pass over the material therein, then downwardly at the rear end of the hopper behind the material to a point where the lower edge of the material-engaging portion of the member substantially engages with the bottom of the hopper, and then forwardly and upwardly in conformity with the inclination at the bottom of the hopper whereby to move the material in the hopper into the body, a connection between said door and said movable member for opening the door upon forward movement of the member, a latch associated with the door for thereupon holding the door in its opened position, and means for manually releasing the latch to drop the door into its closed position.

CYRIL R. GOLLNICK.

References Cited in the file of this patent

UNITED STATES PATENTS

| Number | Name | Date |
|---|---|---|
| 1,236,919 | Emshwiller | Aug. 14, 1917 |
| 1,661,976 | Stovall | Mar. 6, 1928 |
| 2,050,806 | Rey | Aug. 11, 1936 |
| 2,212,058 | Wood | Aug. 20, 1940 |
| 2,323,366 | Barrett | July 6, 1943 |
| 2,335,155 | Lee | Nov. 23, 1943 |
| 2,339,360 | Sicard | Jan. 18, 1944 |
| 2,356,434 | Russell | Aug. 22, 1944 |
| 2,364,308 | Niewendorp | Dec. 5, 1944 |
| 2,371,540 | Mott | Mar. 13, 1945 |
| 2,430,973 | Boissonnault | Nov. 18, 1947 |
| 2,496,192 | Baldt | Jan. 31, 1950 |